(12) United States Patent
Bugosh et al.

(10) Patent No.: US 8,307,940 B2
(45) Date of Patent: Nov. 13, 2012

(54) ELECTRIC POWER STEERING ASSEMBLY

(75) Inventors: Mark Bugosh, Sterling Heights, MI (US); Brian Urbach, Rochester Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 235 days.

(21) Appl. No.: 12/723,781

(22) Filed: Mar. 15, 2010

(65) Prior Publication Data

US 2011/0220432 A1    Sep. 15, 2011

(51) Int. Cl.
*B62D 5/04* (2006.01)

(52) U.S. Cl. .......................................... 180/444; 180/443

(58) Field of Classification Search .................. 180/443, 180/444
See application file for complete search history.

(56) References Cited

U.S. PATENT DOCUMENTS

| | | | |
|---|---|---|---|
| 3,483,407 A | 12/1969 | FrohmUller et al. | |
| 3,546,504 A | 12/1970 | Janssen et al. | |
| 4,577,715 A | 3/1986 | Saito | |
| 4,593,780 A | 6/1986 | Saito | |
| 4,660,671 A * | 4/1987 | Behr et al. | 180/446 |
| 4,754,829 A | 7/1988 | Shimizu | |
| 5,083,626 A | 1/1992 | Abe et al. | |
| 6,186,268 B1 | 2/2001 | Onodera et al. | |
| 6,702,060 B2 | 3/2004 | Tatewaki et al. | |
| 6,938,723 B2 | 9/2005 | Tatewaki et al. | |
| 6,973,990 B2 * | 12/2005 | Honaga et al. | 180/444 |
| 7,025,169 B2 | 4/2006 | Tatewaki et al. | |
| 7,055,646 B2 * | 6/2006 | Bugosh | 180/444 |
| 7,240,763 B2 | 7/2007 | Tatewaki et al. | |
| 7,284,634 B2 * | 10/2007 | Tatewaki et al. | 180/444 |
| 2002/0148673 A1 | 10/2002 | Menjak et al. | |
| 2003/0019686 A1 | 1/2003 | Fakuda et al. | |
| 2011/0127742 A1 * | 6/2011 | Bae et al. | 280/93.513 |

FOREIGN PATENT DOCUMENTS

| | | |
|---|---|---|
| FR | 2408938 A1 | 6/1979 |
| GB | 1207145 A | 9/1970 |
| JP | 08207797 A | 8/1996 |

(Continued)

OTHER PUBLICATIONS

International Search Report for PCT/US2011/020456 dated Feb. 8, 2012.

*Primary Examiner* — Tashiana Adams
*Assistant Examiner* — Michael Stabley
(74) *Attorney, Agent, or Firm* — MacMillan, Sobanski & Todd, LLC (57) ABSTRACT

An improved structure for a rack drive assembly adapted for use in a vehicle electric power steering assembly includes a ball nut assembly operatively connected to a screw portion of a rack portion of a steering member of the power steering assembly for effecting axial movement of the steering member upon rotation of a vehicle steering wheel. According to one embodiment, the ball nut assembly includes a ball nut having an outer surface; a bearing assembly fixedly disposed in the rack housing and carried by the ball nut for rotatably supporting the ball nut assembly relative to the steering member; and a damper disposed on an outer race of the bearing assembly. The damper includes a pair of dampers disposed on the outer race of the bearing assembly, each of the dampers including at least a first member formed from a first rigid material and a second member formed from a second damping material.

20 Claims, 7 Drawing Sheets

FOREIGN PATENT DOCUMENTS

| | | |
|---|---|---|
| JP | 2000159126 A | 6/2000 |
| JP | 2000168581 A | 6/2000 |
| JP | 2001097232 A | 4/2001 |
| JP | 2003037015 A | 2/2003 |
| JP | 2003104214 A | 4/2003 |
| JP | 2004113627 A | 4/2004 |
| JP | 2005186781 A | 7/2005 |
| KR | 1020040092136 A | 11/2004 |
| KR | 1020110060816 | * 11/2010 |

* cited by examiner

FIG. 5a

ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated. This type of electric power steering assembly has advantages over other known electric power steering assemblies. However, when this type of electric power steering assembly is actuated, undesirable noise can be produced from one or more of the associated components of the rack drive assembly. Thus, it would be desirable to provide an improved structure for a rack drive assembly of an electric power steering assembly which reduces noise in the assembly and yet is simple and inexpensive.

SUMMARY OF THE INVENTION

This invention relates to an improved structure for a rack drive assembly adapted for use in a vehicle electric power steering assembly. According to one embodiment, the electric power steering assembly includes a steering member disposed in a rack housing and including a rack portion operatively connected to a vehicle steering wheel and a screw portion; a ball nut assembly operatively connected to the screw portion of the rack portion of said steering member for effecting axial movement of the steering member upon rotation of a vehicle steering wheel, the ball nut assembly includes a ball nut having an outer surface; a bearing assembly disposed in the rack housing and carried by the ball nut for rotatably supporting the ball nut assembly relative to the steering member; at least one spanner nut carried by the rack housing for securing the bearing assembly in the rack housing; and an electric motor operatively connected to ball nut by a pulley assembly; wherein a damper is disposed on an outer race of the bearing assembly between selected adjacent surfaces of the outer race of the bearing assembly, the spanner nut and the rack housing and is adapted to be engaged by said at least one spanner nut.

According to another embodiment, a ball nut assembly is provided which is adapted for use in a rack drive assembly of a vehicle electric power steering assembly, the rack drive assembly including a steering member disposed in a rack housing and having a rack portion operatively connected to a vehicle steering wheel and a screw portion, the vehicle electric power steering assembly including an electric motor operatively connected to the ball nut assembly by a pulley assembly. The ball nut assembly of this embodiment includes a ball nut assembly operatively connected to the screw portion of the rack portion of the steering member for effecting axial movement of the steering member upon rotation of a vehicle steering wheel, the ball nut assembly including a ball nut having an outer surface; a bearing assembly fixedly disposed in the rack housing and carried by the ball nut for rotatably supporting the ball nut assembly relative to the steering member; and a damper disposed on an outer race of the bearing assembly, wherein the damper includes a pair of dampers disposed on the outer race of the bearing assembly, each of the dampers including at least a first member formed from a first rigid material and a second member formed from a second damping material.

According to yet another embodiment, a ball nut assembly is provided adapted for use in a rack drive assembly of a vehicle electric power steering assembly, the rack drive assembly including a steering member disposed in a rack housing and having a rack portion operatively connected to a vehicle steering wheel and a screw portion, the vehicle electric power steering assembly including an electric motor operatively connected to the ball nut assembly by a pulley assembly. According to this embodiment, the ball nut assembly includes a ball nut assembly operatively connected to the screw portion of the rack portion of the steering member for effecting axial movement of the steering member upon rotation of a vehicle steering wheel, the ball nut assembly including a ball nut having an outer surface; a bearing assembly fixedly disposed in the rack housing and carried by ball nut for rotatably supporting the ball nut assembly relative to the steering member; and a damper disposed on an outer race of the bearing assembly, wherein the damper includes a pair of dampers disposed on the outer race of the bearing assembly, each of the dampers including at least a first member formed from a rigid material, a second member formed from a second damping material, and a third member formed from a rigid material, the second members disposed on an outer side of the first member and the third members disposed adjacent the outer race of the bearing assembly.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
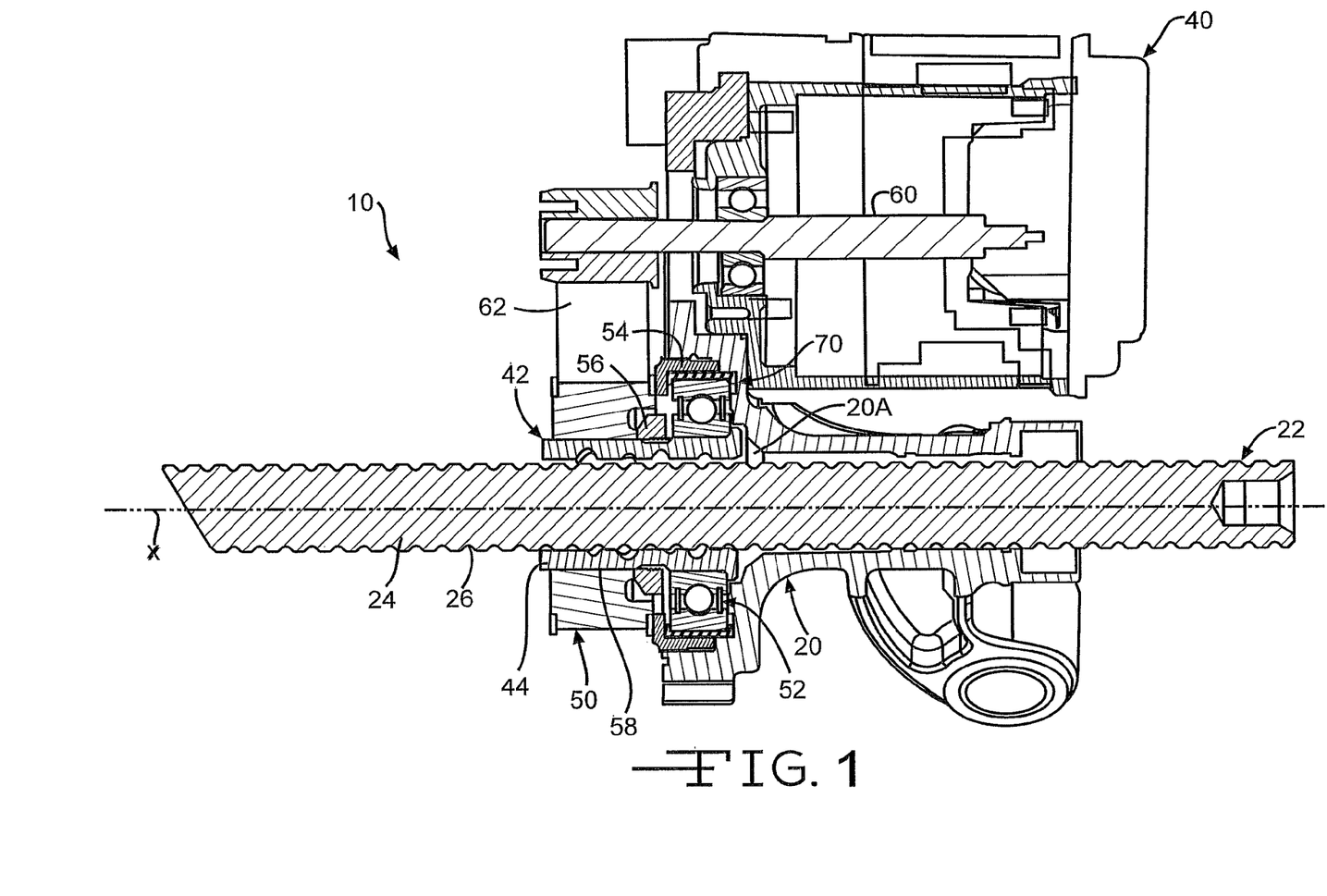
FIG. 1 is a sectional view of a portion of a first embodiment of a vehicle electric power steering assembly.
Figure 2:
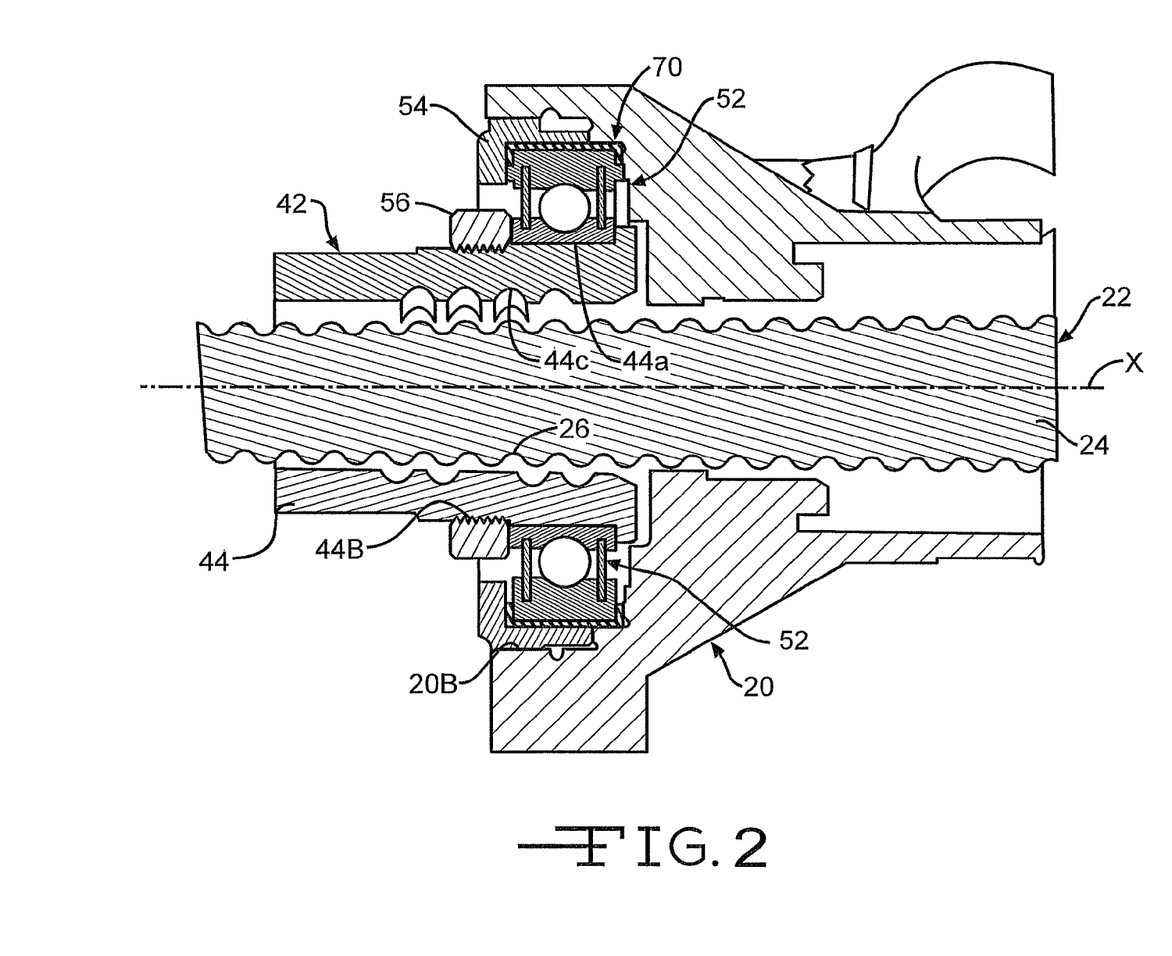
FIG. 2 is a view of a portion of the vehicle electric power steering assembly illustrated in FIG. 1.
Figure 3:
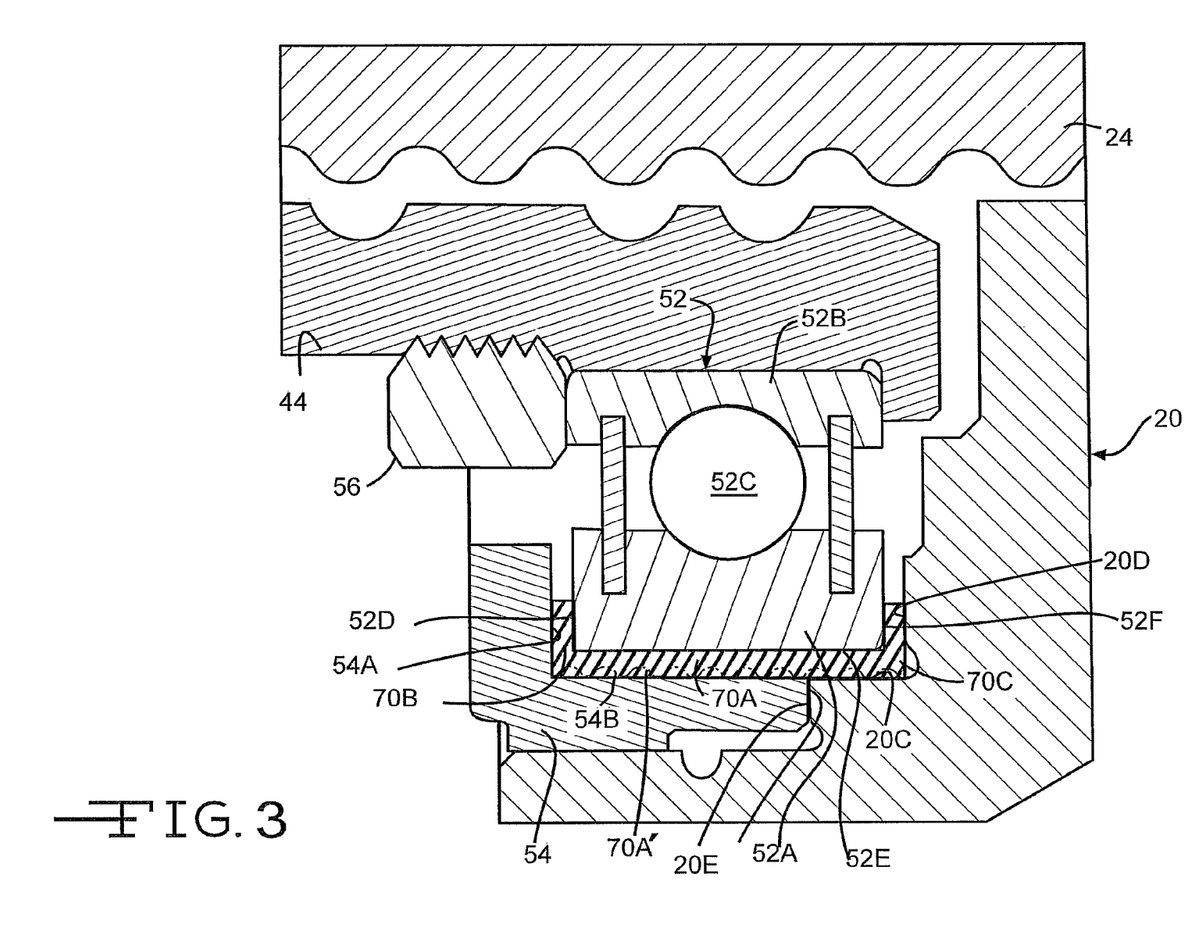
FIG. 3 is an enlarged view of a portion of the vehicle electric power steering assembly illustrated in FIGS. 1 and 2.

Referring now to FIGS. 1-3, there is illustrated a first embodiment of a vehicle electric power steering assembly, indicated generally at 10, constructed in accordance with the present invention. The illustrated vehicle electric power steering assembly 10 is a vehicle electric belt driven rack drive steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies. For example, the invention may be used in connection with other electric power steering assemblies if so desired, such as for example, as shown in U.S. Pat. No. 7,055,646 to Bugosh, U.S. Pat. No. 6,644,432 to Yost et al., and U.S. Pat. No. 6,378,646 to Bugosh, the disclosure of each of these patents incorporated by reference in entirety herein.

The illustrated electric power steering assembly 10 includes a rack housing, partially shown and indicated generally at 20, and a steering member, partially shown and indicated generally at 22, disposed therein. The steering member 22 is linearly (or axially) movable along a rack axis X. The steering member 22 includes a rack portion (not shown) which is provided with a series of rack teeth which meshingly engage gear teeth (not shown) provided on a pinion (not shown) which is operatively connected to a steering wheel (not shown) of the vehicle.

In the illustrated embodiment, the steering member 22 further includes a screw portion 24 having an external thread convolution 26. The steering member 22 is connected with steerable wheels (not shown) of the vehicle through tie rods (not shown) located at the distal ends of the steering member 22. Linear movement of the steering member 22 along the rack axis X results in steering movement of the steerable wheels in a known manner.

The illustrated electric power steering assembly 10 further includes an electric motor 40 which, as will be discussed below in detail, is drivably connected to a ball nut assembly, indicated generally at 42, for effecting axial movement of the steering member 22 upon rotation of the vehicle steering wheel. In the event of the inability of the electric motor 40 to effect axial movement of the steering member 22, the mechanical connection between gear teeth on the pinion and rack teeth on the rack portion of the steering member 22 permits manual steering of the vehicle.

In the illustrated embodiment, the ball nut assembly 42 is located in a chamber 20A of the rack housing 20 and encircles the screw portion 24 of the steering member 22. As will be discussed below, the ball nut assembly 42 includes a ball nut 44 which is suitably secured to a pulley assembly, indicated generally at 50, for rotation therewith. In the illustrated embodiment, the ball nut 44 is secured to the pulley assembly 50 by a press fit. In addition, a tolerance ring 58 (shown in FIG. 1), is also preferably disposed on at least a portion of an outer portion of the ball nut 44 on which a pulley of the pulley assembly 50 is disposed in order to ensure that the press fit load does not deform the/a case of the ball nut 44. Alternatively, the ball nut 44 may be secured to the pulley assembly 50 by other suitable means if so desired.

The illustrated electric power steering assembly 10 further includes a bearing assembly, indicated generally at 52. The illustrated bearing assembly is a single row ball type of bearing assembly 52 and includes an outer race 52A, an inner race 52B and balls 52C disposed therebetween. Alternatively, the particular construction of the bearing assembly 52 may be other than illustrated if so desired.

As best shown in FIGS. 2 and 3, the bearing assembly 52 is disposed on a cylindrical outer surface 44A of the ball nut 44. To accomplish this in the illustrated embodiment, a pair of spanner nuts 54 and 56 are provided. The spanner nut 54 is a first or "outer" spanner nut 54 which screws onto threads provided in a cylindrical inner surface 20B of the housing 20, and the spanner nut 56 is a second or "inner" spanner nut which screws onto threaded provided on an externally threaded portion 44B of the ball nut 44. During assembly, the spanner nuts 54 and 56 are operative to load the bearing assembly 52 and once assembled the bearing assembly 52 is operative to rotatably support the ball nut 44 relative to the steering member 22. Alternatively, other methods can be used to retain the bearing assembly 52 and/or to rotatably support the ball nut 44 relative to the steering member 22.

The ball nut assembly 42 further includes a plurality of force-transmitting members (not shown). The force transmitting members comprise balls (not shown), which are disposed between an internal screw thread convolution 44C of the ball nut 44 and the external thread convolution 26 on the screw portion 24 of the steering member 22. The balls are loaded into the ball nut assembly 42 in a known manner. The ball nut assembly 42 further includes a recirculation passage (not shown) for recirculating the balls upon axial movement of the steering member 22 relative to the ball nut assembly 42.

The electric motor 40 is supported relative to the rack housing 20 by suitable means. In the illustrated embodiment, the electric motor 40 includes an output shaft 60 which is connected to a member 62 for rotation therewith. In the illustrated embodiment, the member 62 is a timing belt. The timing belt 62 is operatively connected to the pulley assembly 50. Thus, when the electric motor 40 is actuated via a controller (not shown), the timing belt 62 is rotated via the output shaft 60 so as to rotate the pulley assembly 50. The rotation of the pulley assembly 50 causes the ball nut 44 to be rotated. The rotation of the ball nut 42 results in linear movement of the steering member 22. The balls transmit the rotational force of the ball nut 44 to the rack portion of the steering member 22. Because the ball nut 44 is fixed in position axially, the steering member 22 is driven to move axially in response, effecting steering movement of the steerable wheels of the vehicle.

In the illustrated embodiment, the electric power steering assembly 10 further includes a damper or insulator, indicated generally at 70. The damper 70 is operatively disposed between selected adjacent surfaces of the bearing assembly 52, the spanner nut 54 and the housing 20. In particular, in the illustrated embodiment as best shown in FIG. 3, the damper 70 is preferably disposed between a first generally radially extending outer race side surface 52D of the bearing assembly 52 and a first generally radially extending inner surface 54A of the spanner nut 54; a second axially extending outer race surface or outer diameter surface 52B of the bearing assembly 52 and a second generally axially extending cylindrical inner surface 54B of the spanner nut 54; the second axially extending outer race surface 52B of the bearing assembly and a first generally axially extending cylindrical inner surface 20C of the housing 20; and a third generally radially extending outer race side surface 52C of the bearing assembly 52 and a second generally radially extending inner surface 20D of the housing 20.

In the illustrated embodiment, the damper 70 is shown as being a generally channel-shaped (or generally U-shaped) damper 70 and includes a base 70A and a pair of opposed sides or legs 70B and 70C. The damper 70 is formed from a suitable damping material and in the illustrated embodiment is preferably molded in place as a one-piece or integral damper onto the outer race or portion 52D of the bearing assembly during a molding process so as to be fixedly secured thereon. A suitable material for the damper 70 is a rubber material, such as for example, a nitrile rubber (NBR), neoprene (chloroprene CR) and urethane. Alternatively, the damper 70 may be formed from other suitable type of materials if so desired. Alternatively, the particular shape, construction, material and/or configuration of the damper 70 may be other than illustrated and described if so desired.

For example, the damper 70 could have a shape other than the illustrated generally channel shape or U-shape and/or the damper 70 could cover or be disposed on less than the three surfaces 52D, 52E and 52F of the outer race 52A of the bearing assembly 52 if so desired. For example, the damper 70 may only be disposed on the surface 52E of the bearing assembly 52 if so desired. Also, selected portions or the entire outer surface of the damper 70 could be other than illustrated. For example, selected portions and/or the entire outer surface of the damper 70 could be wavy, corrugated or have ribs or lips provided thereon, especially at least on an outer surface of the base 70A thereof if so desired (e.g., the outer surface of the base 70A shown in phantom in FIG. 3 by reference number 70A' as being wavy or corrugated). In addition, during assembly, it may be desirable to apply a lubricant or other suitable substance to an outer surface of the damper 70 to prevent damage thereto during assembly.

Also, the "fit" of the spanner nut 54 to the damper 70 is preferably a slip fit relative to the damper 70 so that during assembly as the spanner nut 54 is rotated and advanced over portions of the damper 70 the spanner nut 54 preferably does not grab and distort the material of the damper 70; however, the fit may also be an interference fit if so desired. Preferably, in the illustrated embodiment the spanner nut 54 is tightened to a predetermined torque which may occur before an inner end 54C thereof engages an inner "stop" side surface 20E of the housing 20 or after the inner end 54C thereof engages the inner stop side surface 20E of the housing 20. This will preferably force the material thereof in the legs 70B and 70C of the damper 70 against the adjacent surfaces of the spanner nut 54 and the housing 20, respectively, causing such material to be squeezed or compressed thereagainst. Alternatively, other means may be used to facilitate assembly and/or prevent damage of the damper 70 during assembly. For example, as discussed above, regardless of whether the fit is a slip fit or an interference fit, a lubricant and/or one or more portions of the outer surface of the damper 70 can include surface features which aid to reduce or prevent damage to the damper 70 during assembly.

Figure 4:
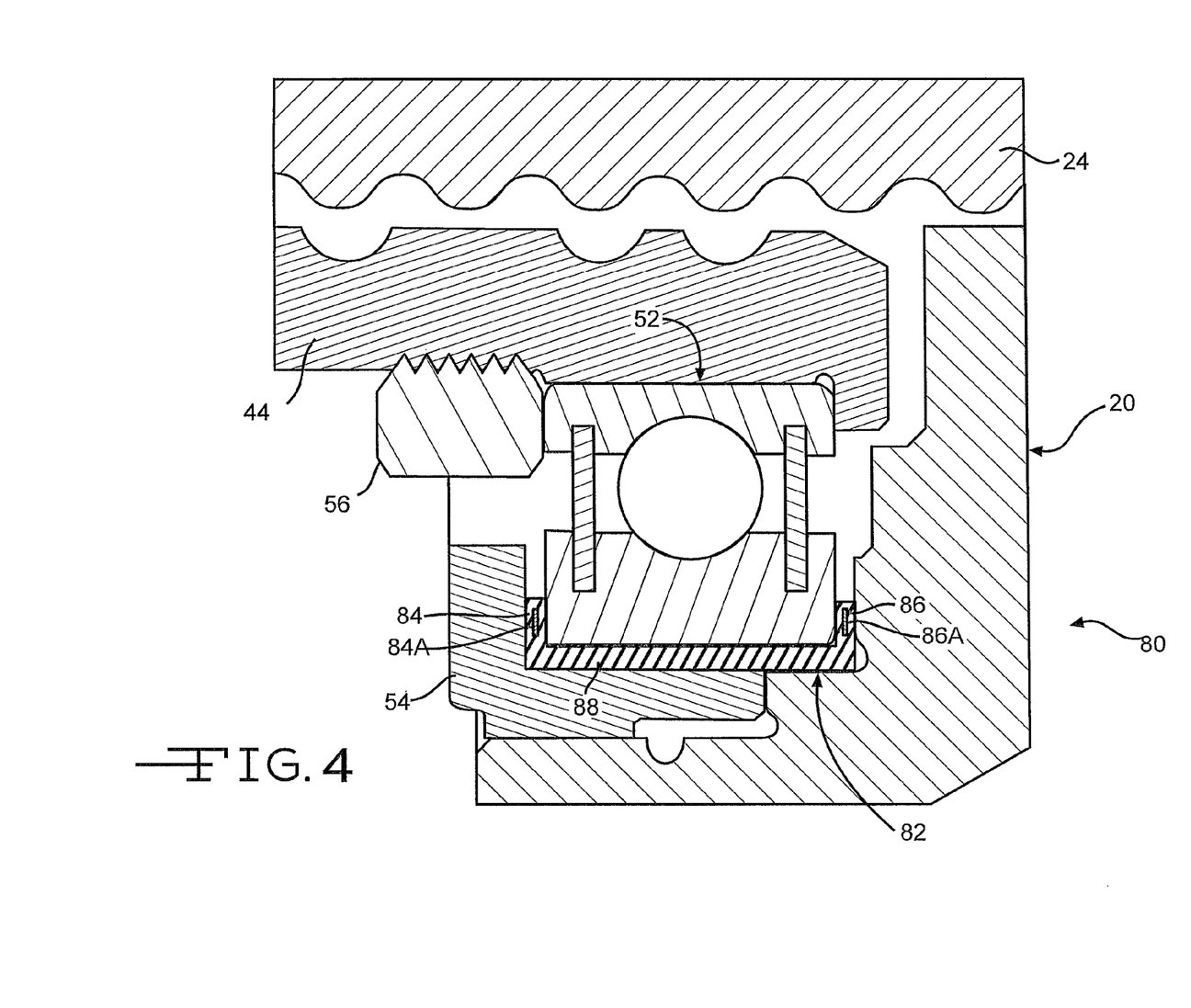
FIG. 4 is an enlarged view of a portion of a second embodiment of a vehicle electric power steering assembly.

Turning now to FIG. 4 and using like reference numbers to indicate corresponding parts, there is illustrated a portion of a second embodiment of a vehicle electric power steering assembly, indicated generally at 80, constructed in accordance with the present invention. In this embodiment, a damper 82 is provided having one or more metal plates or otherwise rigid members disposed therein, preferably disposed therein by integrally molding the plates or members therein.

In the illustrated embodiment, the damper 82 is preferably provided with at least integrally molded metal plates 84A and 86A disposed at least within a portion of one or both of a pair of sides or legs 84 and 86, respectively, thereof. Preferably, this embodiment of the damper 82 would not be molded onto the associated bearing assembly 52 but would be preferably fitted or stretched thereon prior to assembly. However, if so desired, the damper 82 may be molded onto the bearing assembly 52. Alternatively, the shape, construction and/or configuration of the damper 82, including the shape, construction and/or configuration of one or more of the plates 84A and 86A, may be other than illustrated and described if so desired. For example, one or more plates (not shown), in addition to the plates 84A and 86A or in place thereof, may also be integrally molded in a base 88 of the damper 82 extending between the sides 84 and 86 thereof. Further, one or more plates may be molded or disposed on one or more selected outer and/or inner surfaces of the damper 82 if so desired.

Figure 5:
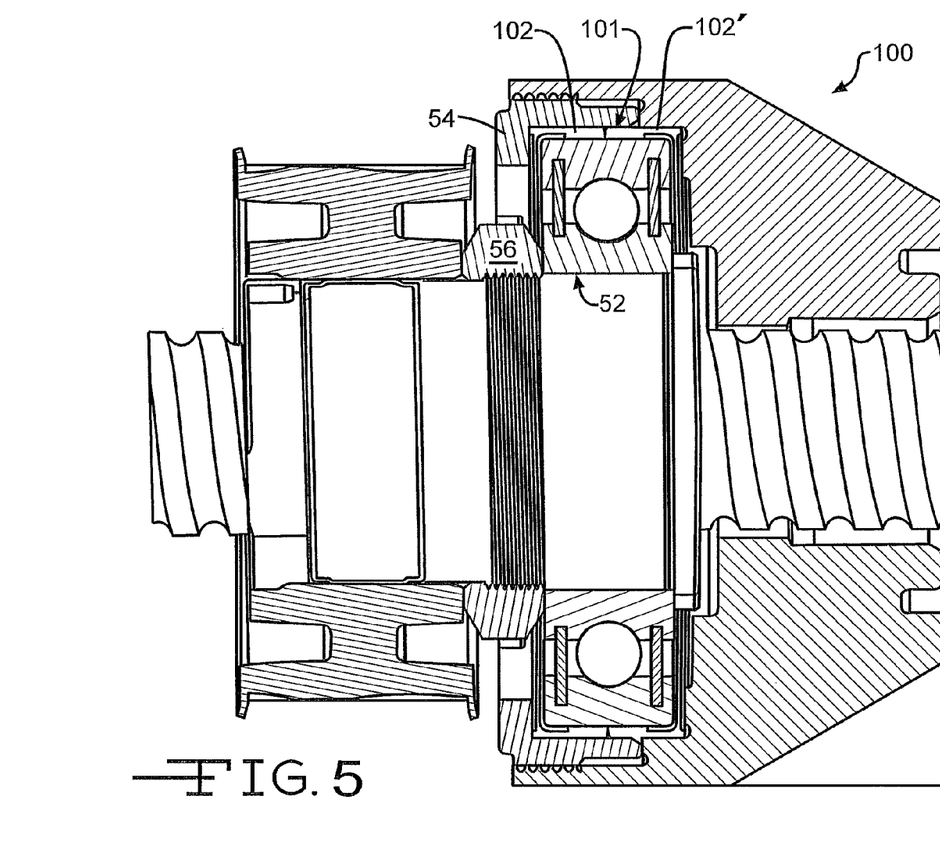
FIG. 5 is a view of a portion of a third embodiment of a vehicle electric power steering assembly.

Turning now to FIG. 5 and using like reference numbers to indicate corresponding parts, there is illustrated a portion of a third embodiment of a vehicle electric power steering assembly, indicated generally at 100, constructed in accordance with the present invention. In this embodiment, the vehicle electric power steering assembly 100 includes a damper or insulator, indicated generally at 101, which is operatively disposed between selected adjacent surfaces of the bearing assembly 52, the spanner nut 54 and the housing 20.

In this embodiment, the damper 101 is comprised of a pair of dampers 102 and 102'. In the illustrated embodiment, each of the pair of dampers 102 and 102' are shown as being identical to each other; however, the construction of the pair of dampers 102 and 102' can be different from each other if so desired. For discussion purposes, since the dampers 102 and 102' are illustrated as being identical, only the construction of the damper 102 will be discussed below in detail. However, reference numbers for the damper 102' corresponding to the same elements for that of the damper 102 will be the same except that they will include a "'" added to them.

Figure 6:
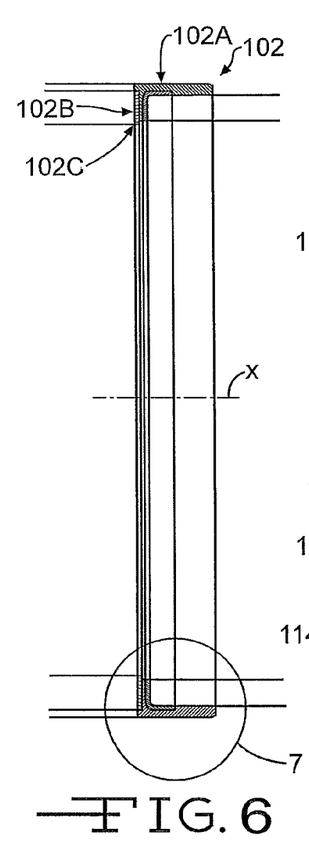
FIG. 6 is a view of a damper of the third embodiment of the vehicle electric power steering assembly shown in FIGS. 5 and 5A.
Figure 7:
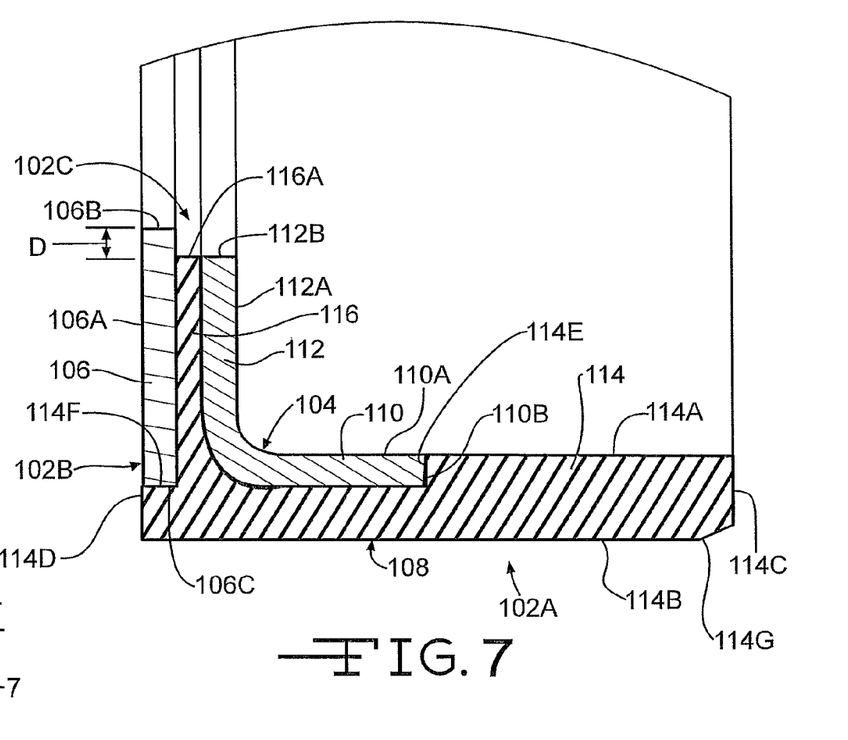
FIG. 7 is an enlarged view of a portion of the damper illustrated in the third embodiment of a vehicle electric power steering assembly.

As best shown in FIGS. 6-7, the illustrated damper 102 is generally an annular ring-like member and defines a longitudinal axis X. Generally, the damper 102 includes a first leg or portion 102A which extends generally parallel to the axis X and a second leg or portion 102B which extends generally perpendicular to the first leg 102A and therefore the axis X. The damper 102 further includes an opening, generally indicated at 102C, formed in the second leg 102B.

Turning now to FIG. 7, the illustrated specific construction of the damper 102 will be discussed in detail. As shown therein, damper 102 includes a first member 104, a second member 106 and a third member 108. The first member 104 is a generally L-shaped member and includes a first generally axially extending leg 110 and a second generally radially extending leg 112. The first leg 110 includes an inner surface 110A and an end surface 110B. The second leg 112 includes an inner surface 112A and an end surface 112B. In the illustrated embodiment, the first leg 110 and the second leg 112 are generally equal to one another. The first member 104 is preferably formed from a generally rigid material, such as for example, a metal material. Alternatively, the first member 104 may be formed from other suitable non-metal materials if so desired. Alternatively, the construction of the first member 104 may be other than illustrated and described if so desired. For example, the particular material of the first member 104 may other than illustrated and described and/or the first leg 110 and the second leg 112 may be other than illustrated and described if so desired.

The second member 106 extends in a generally radial direction parallel with respect to the second leg 112 of the first member 104. In the illustrated embodiment, the second member 106 has a generally rectangular cross-sectional shape and is preferably formed from a generally rigid material, such as for example, a metal material. Alternatively, the second member 104 may be formed from other suitable non-metal materials if so desired. The second member 106 includes an outer surface 106A, a first end surface 106B and an opposite second end surface 106C. Alternatively, the construction of the second member 106 may be other than illustrated and described if so desired. For example, the particular material of the second member 106 may other than illustrated and described and/or cross-sectional shape thereof may be other than illustrated and described if so desired.

The third member 108 is generally L-shaped and includes a first generally axially extending leg 114 and a second generally radially extending leg 116. The first leg 114 includes a stepped inner surface 114A, an outer surface 114B, a first "inner" end 114C, and a second "outer" end 114D. For a purpose to be discussed, below, the second end 114D is preferably defined as a "short" reduced diameter or necked down extension of the first leg 114 of the third member 108 and extends axially outwardly (i.e., to the left in FIG. 7) with respect to the radially extending second leg 116 of the third member 108.

The stepped inner surface 114A includes a first shoulder 114E and a second shoulder 114F. The first shoulder 114E is adapted to receive the end 110B of the first leg 110 of the first member 110, and the shoulder 114F is adapted to receive the end 106C of the second member 106. In the illustrated embodiment, the outer surface 114B is provided with a slight chamfer or taper 114G adjacent the first end 114C thereof.

The third member 114 is preferably formed from a resilient material, such as for example rubber or similar elastomeric materials. Preferably, for manufacturing purposes, the first member 104 and the second member 106 are molded in situ with the third member 108 during the molding process of the third member 108. Also, the dampers 102 and 102' are preferably formed separate formed from the bearing 52 and assembled thereon during an assembly process. Alternatively, the construction of the third member 108 may be other than illustrated and described if so desired. For example, the outer surface 114B and/or the end surface 114D may be provided with a surface feature thereon, such as ribs, corrugations or lips (not shown), if so desired.

As can be seen in FIG. 7, in the illustrated embodiment, the ends 112B and 116A of the first member 104 and the third member 108 are essentially flush with one another and are spaced radially inwardly relative to the end 106B of the second member 106 by a distance D. Alternatively, one or more of the ends 112B, 116A and 106B may be other than illustrated and described if so desired. Also, in the illustrated embodiment, the second leg 116 of the third member 108 is effectively captured or sandwiched between the second member 106 and the second leg 112 of the first member 104.

Further, in the illustrated embodiment, the 114D of third member 108 effectively provides a reduced diameter short extension thereon adjacent the outer end 114D of the third member 108. In addition, the damper 102 may include only the first member 104 and the third member 108 or only the second member 106 and the third member 108. In addition, the dampers 102 and 102' in this embodiment, as well as the previously described dampers 70 and 82, may be used in connection with a power steering assembly that does not include one or both of the spanner nuts 54 and 56 to secure and load the associated bearing assembly but rather includes other suitable means for securing and loading the associated bearing assembly. Examples of such power steering assemblies in which the dampers 102 and 102', 70 and 82 may be used without one or more of the spanner nuts 54 and 56 are illustrated for example in U.S. Pat. No. 7,025,169 to Tatewaki et al. and U.S. Pat. No. 5,083,626 to Abe et al.

Figure 5A:
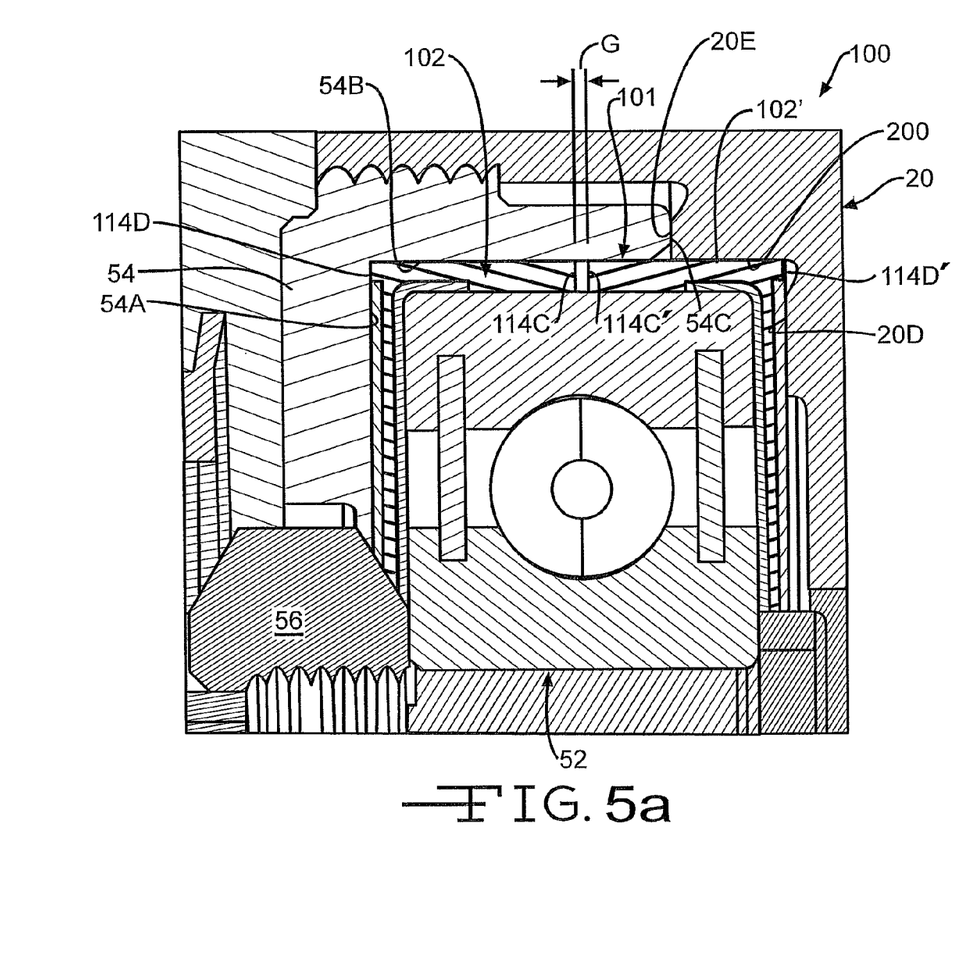
FIG. 5A is an enlarged view of a portion of the third embodiment of the vehicle electric power steering assembly illustrated in FIG. 5.

Referring back to FIG. 5 and also to FIG. 5A, it can be seen that when the dampers 102 and 102' are installed and assembled there exists a relatively slight or small gap or clearance G (best shown exaggerated for clarity), between the respective adjacent end surfaces 114C and 114C' thereof after the outer and inner spanner nuts 54 and 56 have been tightened against the bearing assembly 52 so as to effectively preload the bearing assembly 52.

Also, in the illustrated embodiment it is preferable that, upon the tightening of the outer spanner nut 54 to a predetermined torque, which may occur before the end 54C thereof engages an inner "stop" side surface 20E of the housing 20 or after the end 54C thereof engages the inner stop side surface 20E of the housing 20, the spanner nut 54 will force the material of the damper 102 in the area at least adjacent the end 114D thereof to be squeezed or compressed against the adjacent inner surfaces 54A and 54B of the spanner nut 54. Similarly, upon the tightening of the outer spanner nut 54 to the predetermined torque, the spanner nut 54 may also preferably force the material of the damper 102' in the area at least adjacent the end 114D' to be squeezed or compressed against the adjacent inner surfaces 20C and 20D of the housing 20.

Potential advantages of the electric power steering assemblies 10, 80 and 100 of the present invention is that the respective dampers 70, 82 and 101 should be effective to reduce system noise, vibration and harshness (NVH), should transmit system shock loads into the housing and thus into the vehicle; and should provide a self-centering feature of the associated components of the steering assemblies.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack drive assembly adapted for use in a vehicle electric power steering assembly comprising:
    a steering member disposed in a rack housing and including a rack portion operatively connected to a vehicle steering wheel and a screw portion;
    a ball nut assembly operatively connected to said screw portion of said rack portion of said steering member for effecting axial movement of said steering member upon rotation of a vehicle steering wheel, said ball nut assembly including a ball nut having an outer surface;
    a bearing assembly disposed in said rack housing and carried by said ball nut for rotatably supporting said ball nut assembly relative to said steering member;
    at least one spanner nut carried by said rack housing for securing said bearing assembly in said rack housing; and
    an electric motor operatively connected to said ball nut by a pulley assembly;
    wherein a damper is disposed on an outer race of said bearing assembly between selected adjacent surfaces of said outer race of said bearing assembly, said spanner nut and said rack housing and is adapted to be engaged by said at least one spanner nut;
    wherein a pair of spanner nuts are provided, one of said spanner nuts carried by said rack housing and adapted to operatively engage said damper and said outer race of said bearing assembly and the other one of said pair of spanner nuts carried by a threaded portion of said outer surface of said ball nut and adapted to operatively engage an inner race of said bearing assembly.

2. The rack drive assembly according to claim 1 wherein said damper is molded in place onto said outer race of said bearing assembly during a molding process.

3. The rack drive assembly according to claim 1 wherein said damper is fitted onto said outer race of said bearing assembly.

4. The rack drive assembly according to claim 1 wherein said damper includes at least one metal member disposed in a portion thereof.

5. The rack drive assembly according to claim 1 wherein said damper is generally channel shaped.

6. The rack drive assembly according to claim 1 wherein said damper includes at least a first member formed from a first damping material and a second member formed from a second rigid material.

7. The rack drive assembly according to claim 6 wherein said second member is disposed on an outer side of said first member so as to be engaged by said spanner nut during assembly.

8. The rack drive assembly according to claim 7 wherein said first member includes a portion which extends adjacent said second member so as to be engaged by said spanner nut during assembly.

9. The rack drive assembly according to claim 7 wherein said damper further includes a third member formed from a rigid material, said third member disposed adjacent said outer race of said bearing assembly.

10. The rack drive assembly according to claim 1 wherein a pair of dampers are disposed on said outer race of said bearing assembly, each of said dampers including at least a first member formed from a first rigid material and a second member formed from a second damping material.

11. The rack drive assembly according to claim 10 wherein each of said pair of dampers is generally L-shaped and further includes a third member formed from a rigid material, said first members of said pair of dampers disposed on an outer surface of said second members and said third members of each of said pair of dampers disposed on an inner surface of said second members adjacent said outer race of said bearing assembly.

12. The rack drive assembly according to claim 1 wherein said damper is disposed between a first generally radially extending outer race side surface of said bearing assembly and a first generally radially extending surface of said spanner nut; a second axially extending outer race surface of said bearing assembly and a second generally axially extending cylindrical inner surface of said spanner nut; and a third generally radially extending outer race side surface of said bearing assembly and a generally radially extending inner surface of said rack housing.

13. A ball nut assembly adapted for use in a rack drive assembly of a vehicle electric power steering assembly, the rack drive assembly including a steering member disposed in a rack housing and having a rack portion operatively connected to a vehicle steering wheel and a screw portion, the vehicle electric power steering assembly including an electric motor operatively connected to the ball nut assembly by a pulley assembly, the ball nut assembly comprising:
 a ball nut assembly operatively connected to said screw portion of said rack portion of said steering member for effecting axial movement of said steering member upon rotation of a vehicle steering wheel, said ball nut assembly including a ball nut having an outer surface; and
 a bearing assembly fixedly disposed in said rack housing and carried by said ball nut for rotatably supporting said ball nut assembly relative to said steering member; and
 a damper disposed on an outer race of said bearing assembly;
 wherein said damper includes a pair of dampers disposed on said outer race of said bearing assembly, each of said dampers including at least a first member formed from a first rigid material and a second member formed from a second damping material;
 wherein each of said pair of dampers is generally L-shaped and further includes a third member formed from a rigid material, said first members of said pair of dampers disposed on an outer surface of said second members and said third members of each of said pair of dampers disposed on an inner surface of said second members adjacent said outer race of said bearing assembly.

14. The ball nut assembly according to claim 13 wherein said second member is disposed on an outer side of said first member.

15. The ball nut assembly according to claim 13 wherein said first member includes a portion which extends adjacent said second member.

16. The ball nut assembly according to claim 13 wherein each of said pair of dampers further includes a third member formed from a rigid material, said third members disposed adjacent said outer race of said bearing assembly.

17. The ball nut assembly according to claim 13 wherein a spanner nut is carried by said rack housing for operatively engaging said pair of dampers and said bearing assembly.

18. A rack drive assembly adapted for use in a vehicle electric power steering assembly comprising:
 a steering member disposed in a rack housing and including a rack portion operatively connected to a vehicle steering wheel and a screw portion;
 a ball nut assembly operatively connected to said screw portion of said rack portion of said steering member for effecting axial movement of said steering member upon rotation of a vehicle steering wheel, said ball nut assembly including a ball nut having an outer surface;
 a bearing assembly disposed in said rack housing and carried by said ball nut for rotatably supporting said ball nut assembly relative to said steering member;
 at least one spanner nut carried by said rack housing for securing said bearing assembly in said rack housing; and
 an electric motor operatively connected to said ball nut by a pulley assembly;
 wherein a damper is disposed on an outer race of said bearing assembly between selected adjacent surfaces of said outer race of said bearing assembly, said spanner nut and said rack housing and is adapted to be engaged by said at least one spanner nut;
 wherein said damper includes at least a first member formed from a first damping material and a second member formed from a second rigid material;
 wherein said second member is disposed on an outer side of said first member so as to be engaged by said spanner nut during assembly.

19. The rack drive assembly according to claim 18 wherein said first member includes a portion which extends adjacent said second member so as to be engaged by said spanner nut during assembly.

20. The rack drive assembly according to claim 18 wherein said damper further includes a third member formed from a rigid material, said third member disposed adjacent said outer race of said bearing assembly.

* * * * *